United States Patent
Feldmeier (10) Patent No.: US 8,522,824 B2
(45) Date of Patent: Sep. 3, 2013

(54) ASEPTIC OR SANITARY DIAPHRAGM VALVE

(75) Inventor: Robert H. Feldmeier, Fayetteville, NY (US)

(73) Assignee: Feldmeier Equipment, Inc., Syracuse, NY (US)

( * ) Notice: Subject to any disclaimer, the term of this patent is extended or adjusted under 35 U.S.C. 154(b) by 364 days.

(21) Appl. No.: 12/883,518

(22) Filed: Sep. 16, 2010

(65) Prior Publication Data

US 2011/0260091 A1  Oct. 27, 2011

Related U.S. Application Data

(63) Continuation-in-part of application No. 12/766,009, filed on Apr. 23, 2010, now abandoned.

(51) Int. Cl.
*F16K 11/22* (2006.01)
(52) U.S. Cl.
USPC ............................ 137/883; 137/885; 251/63.5

(58) Field of Classification Search
USPC ................ 137/883, 885; 251/62, 63.5, 335.2
See application file for complete search history.

(56) References Cited

U.S. PATENT DOCUMENTS

| | | | | |
|---|---|---|---|---|
| 3,838,707 A | * | 10/1974 | Wachowitz, Jr. | 137/312 |
| 4,175,591 A | * | 11/1979 | Welker | 137/883 |
| 7,766,028 B2 | * | 8/2010 | Massengale et al. | 137/15.19 |

* cited by examiner

*Primary Examiner* — John Fox
(74) *Attorney, Agent, or Firm* — Bernhard P. Molldrem, Jr.

(57) ABSTRACT

An aseptic or sanitary diaphragm valve has a valve body and at least one cylinder-actuated valve mechanism. A chamber is defined between a cylinder head and a plate or disk, which has a central bore or passage. A flexible diaphragm extends across the cylinder below the plate or disk. A piston within a cylinder is connected with a valve member foot portion, with a stem passing from the foot portion, penetrating the diaphragm, and passing through the bor or passage to the piston. A compression spring urges the piston to either its raised or lowered position, and air pressure may be used to lower or to raise the piston and the associated valve foot. An aperture in the cylinder can reveal a compromise of the diaphragms.

17 Claims, 8 Drawing Sheets

ASEPTIC OR SANITARY DIAPHRAGM VALVE

This is a continuation-in-part of my patent application Ser. No. 12/766,009, filed Apr. 23, 2010 now abandoned.

BACKGROUND OF THE INVENTION

This invention relates to equipment for processing of liquids that must be kept aseptic, i.e., pharmaceuticals, dairy products, or other food products for human consumption. Such products would include milk, cream, ice cream mix, fruit juices and soups, or pharmaceuticals. The invention is more particularly concerned with sanitary valves of the type used in the dairy, food processing, and/or pharmaceutical industries, in which the flow of a fluid is to be regulated or diverted from one flow path to another. The invention is also concerned with diaphragm valves, that is, valves of the type in which a flexible membrane isolates the mechanical portions of the valve from the flow of fluid. The invention is more specifically concerned with a diaphragm valve of simple design and which can be cleaned and sterilized in place by the flow of a cleaning liquid through the valve. Sanitary diaphragm valves of this type can be used in a milk pasteurization line as a bypass valve or as a pressure regulating valve.

Pasteurization of milk and other processes for heat treating milk or other food or ingestible products are required to conform to published standards of the U.S. Public Health Service, and there are similar regulations concerning equipment for processing other products. By law, the milk or other product has to be heated to certain temperatures and held at a particular temperature. The pressures and pressure differentials of the product have to be closely monitored at certain points in the process. This means that accurate pressure regulating valves have to be present in the conduit, and must be replaced whenever they fail. Diversion valves are also required to divert the milk or other liquid food product from a continuous flow pasteurization path to another path in the event that the process needs to be interrupted or if a problem develops in the line. On the other hand, in order to ensure that the sanitary conduit can be cleansed and sanitized between processes, the conduit, including any diversion valves and pressure regulating valves, need to be designed so that it can be completely cleaned in place of any milk or other product by washing it and rinsing it with a cleaning fluid that must reach every point on the interior of the conduit, including every point in the valve cavities. No threaded connectors can be used anywhere that the liquid product flows, because of the difficulty in cleaning the threads. Any threads need to be sealed off and isolated from any contact with the processed fluid. In order to accommodate this requirement, the sanitary valves used in the dairy industry and other food processing industries have been complex and difficult to repair and maintain, and represent a significant capital expense.

A diaphragm based poppet valve, as used in the chemical processing industry, is described in Leys U.S. Pat. No. 7,063,304. Diaphragm valves can also be used as pilot valves in the context of a pneumatic volume booster, e.g., Lafler et al. U.S. Pat. No. 6,668,848.

OBJECTS AND SUMMARY OF THE INVENTION

It is an object of the present invention to provide an aseptic or sanitary diaphragm valve arrangement of simple construction, and capable of being cleaned in place when installed in conduits for liquid food products, which is capable of controlling flow and/or pressure of the liquid product, and which avoids the drawbacks of the prior art.

It is another object to provide an aseptic or sanitary valve that is formed of a flat plate construction, avoiding the need to machine or manufacture complex surfaces within the valve cavity.

Another object is to provide a valve design permitting the valve to be constructed as a simple two-port valve or as a multiple-port valve.

It is a further object to provide a diaphragm valve that is capable of reliably regulating the flow pressure of fluids in a sanitary flow path.

According to one aspect of the invention, a sanitary or aseptic diaphragm valve is provided for use in connection with a sanitary conduit, e.g., a pasteurizer, through which a liquid product, e.g., milk, flows. In a pressure control valve arrangement, the sanitary diaphragm valve is formed of a flat lower plate and a cooperatively shaped flat upper plate. These fit together in clamshell fashion to form a flow space between them. The flat lower plate has a first round opening leading to a first tubular port on a lower side of the plate. A second opening may be on the plate or elsewhere, and this second opening leads to a second tubular port. The flat upper plate is generally coextensive with the lower plate and is spaced from it. A cylinder is positioned on the upper plate above the first opening of the lower plate and in register therewith. The cylinder extends upward above the second plate and has an open side facing the first opening. A piston within the cylinder is free to move up and down between a raised position and a lowered position. A flexible diaphragm is situated across the cylinder above the piston and a second flexible diaphragm may be situated across the cylinder below the piston. The diaphragm(s) stretch with motion of the associated piston such that they permit the piston to travel between its raised and lowered positions. The diaphragms are also air tight and water tight. In some embodiments the piston is free, and does not penetrate either diaphragm. A movable valve element is formed of a stem that is aligned axially with the cylinder and with the first opening. An upper head member at the upper end of the stem is situated against an under side of the second diaphragm and below the free piston. A lower valve plug at a lower end of the stem is aligned with the lower opening and seats in the opening so as to close when the piston is in its lowered position and to lift away from the first opening to an open state when the piston is in its raised position. A pneumatic or a mechanical control is used to urge the upper diaphragm and piston downward in a controlled manner. This applies a controlled closing force to an upper surface of the first flexible diaphragm to urge the piston from its raised position to its lowered position to effect seating of the valve member onto the first opening. This creates a controlled closing force against the opening. The fluid enters (or leaves) the valve flow space through the first conduit and the first opening. The controlled closing force is overcome by the pressure of the entering fluid. The valve configured in this fashion serves as a pressure control.

In one embodiment, compressed air is applied to the cylinder, and in this embodiment the cylinder head has an air nipple to receive the compressed air for applying a controlled force onto the first diaphragm. The flexible diaphragm(s) may comprise a flat sheet of a silicone rubber. Preferably also, each cylinder includes a leakage-evident opening therethrough between the flexible diaphragm(s), so that in the event that a tear or perforation occurs in the diaphragm, the fluid (or compressed air) will flow into the piston space and out the opening, where it will provide a visible indication of a fault. In some preferred constructions, the lower plug may be frustoconic in shape, and the associated round opening may have a corresponding bevel at the upper side of the lower plate. Control air in an air conduit provides the motive force to cause the piston to descend and close the valve, either to cut off flow or to regulate its pressure.

In another preferred embodiment, the sanitary dual diaphragm valve may be designed for use as a diversion valve. A flat lower plate has an upper side which has a first round opening leading to a first tubular port on a lower side of the plate, a second opening leading to a second tubular port on the lower side of the plate, and a third round opening leading to a third tubular port on the lower side of the plate. A flat upper plate may be generally coextensive with the lower plate and is spaced above it so as to define a flow space between the two plates. The upper plate has a first cylinder situated above the first opening and in register with it. The cylinder rises upward above the second plate and has an open side that faces down towards the first opening. Similarly, a second cylinder is situated above the second opening in register with the second, corresponding opening. This cylinder rises upward above the upper plate and has a lower, open side facing the second opening. There are pistons, which may be free pistons, situated within the respective cylinders. These pistons are independently movable between a raised position and a lowered position. Within each of these cylinders, a flexible diaphragm is situated across the cylinder above the respective piston and another flexible diaphragm may be situated across the cylinder below such piston, and adapted to permit the associated piston to travel between its raised and lowered positions. For each cylinder, there is a valve member that has a stem aligned axially with the respective cylinder and the associated one of the first and second openings. A head member at an upper end of the respective stem is situated against an under side of the second or lower diaphragm of the associated cylinder. The valve member has a valve foot at the lower end of the stem and this aligned with the associated one of said valve openings and is adapted to close against the opening when the associated piston is in its lowered position, and to raise away from the associated opening when the piston is in its raised position. A mechanism, such as controlled compressed air, is employed for applying a closing force to the upper surfaces of the flexible diaphragm of each of the first and second (and possible further) cylinders. This urges the piston from its raised position to its lowered position to effect seating of the valve foot onto the respective valve opening, and controlled release of the closing force allows the associated piston to rise from its lower position to its raised position for lifting the valve foot from the associated valve opening. Air pressure may be applied to one or the other cylinder to effect closure of one flow path and opening of another flow path.

In some favorable embodiments, the cylinder may have a cylinder head mounted on an upper rim, with the first flexible diaphragm mounted between them. The cylinder head may have air nipple therein to receive compressed air. The flexible diaphragm(s) may comprise a flat sheet of a food-grade silicone rubber. Each cylinder has a leakage-evident opening at the piston space between the first and second flexible diaphragms.

The upper and lower valve body plates may together comprise a clamshell design in which the two plates or valve halves close together to form the flow space between them. A support bracket may be provided to resist the forces of the fluid under pressure. This may comprise upper and lower Y-shaped components that bolt together at the periphery of the valve body formed of the upper and lower plates. Alternatively, the upper and lower plates may each have a central bore formed in them. A threaded post then passes through the central bores of the upper and lower plates. In this case, the threaded post has a shaft member of smooth surface but with threaded end portions. The smooth surface is in contact with the fluid in the valve. The upper and lower seal members seal off the smooth surface shaft member at these two central bores. A female-threaded cap, threaded nut or similar threaded fastener member is applied to each end of the post where the post passes through the central opening of the upper and lower plate. In this embodiment, the post absorbs the stress of the pressurized fluid against the upper and lower plates of the valve.

In a diverter embodiment, each lower foot may generally be in the form of a disk spanning the associated valve opening, and each disk may have a ring seal supported at a periphery of the disk. The round openings in the lower plate may have an edge beveled below the upper surface of the lower plate.

A spring-loaded auxiliary piston may be used for a normally-closed valve embodiment, in which air pressure is applied to open the valve.

In another embodiment, each of the diaphragm valves can be constructed with each cylinder having a disk or plate closing off the cylinder below the piston, and with a rod or stem extending from the piston through a bore in the plate to the valve foot. A flexible diaphragm extends across the cylinder beneath the plate, and the stem penetrates the diaphragm, but is sealed at the penetration. The diaphragm moves with the piston and stem to allow the piston to move between its upper and lower positions. A leakage-evident opening in the plate or disk extends from between the disk or plate and the diaphragm, so that if any of the controlled fluid leaks through the diaphragm is will weep out at the opening and provide a visible indication of leakage. A spring can be positioned above the piston to urge it down to a closed position, with air being applied through an air nipple to raise the piston. Alternatively, the spring may be positioned between the piston and the plate or disk to bias the piston upward, and control air may be applied through an air nipple above the piston to urge the piston and valve foot to the closed position.

Tri-clamps or equivalent sanitary clamp means may be used to attach the cylinder components and the diaphragms. The tri-clamp allows the valve to be partly disassembled for maintenance or repair on-station.

The processing equipment associated with valves of this invention may be used for whole milk, skim milk, cream, or other dairy products such as flavored milk or ice cream mix. These valves are especially useful in an aseptic process. The arrangements of this invention may also be used for processing orange juice, grapefruit juice, apple juice, or other fruit juices. The equipment may be of a tubular heat exchanger design, and may be cleaned-in-place with a minimum of down time. A triple-tube heat exchanger that is suitable for use in various possible processes is described in Feldmeier U.S. Pat. No. 3,386,497, which is incorporated herein by reference.

The above and many other objects, features, and advantages of the arrangements of the present invention will become apparent from the ensuing detailed description of preferred embodiments of the invention, when read in connection with the accompanying Drawing.

DETAILED DESCRIPTION OF THE PREFERRED EMBODIMENT

With initial reference to the embodiment illustrated in FIGS. 1 to 5, an aseptic valve or sanitary valve 10 of the present invention may be employed on a tubular sanitary conduit, suitable for processing a dairy product, such as milk or ice cream mix, another edible product such as fruit juice, sauce or soup, or a pharmaceutical product for human or veterinary use. The valve 10 may be useful in an aseptic process, e.g., where UHT pasteurization is employed.

The aseptic or sanitary valve 10 of this embodiment has one inlet and two outlets, and serves to switch fluid flow from an inlet tube 12 between a first outlet tube 14 and a second outlet tube 16. Other embodiments of this valve may have two or more controlled outlets. A valve body 20 in this embodiment is made in a clamshell design, with a lower plate or disk 22 with a circumferential flange 23 and a mating upper plate or disk 24 with a circumferential flange 25. The upper and lower plates 22, 24 are spaced a predetermined distance from one another and define a valve space or flow space 26 between one another. On the lower plate an inlet opening 28 (see FIG. 5) communicates with the inlet tube 12. A first outlet opening 32 (see FIG. 4) communicates with the first outlet tube 14 and a second outlet opening 34 communicates with the second outlet tube 16. On the upper plate 24 there is a first valve control cylinder 36 and a second valve control cylinder 38, which are open at their lower ends into the valve flow space 26. The cylinders 36, 38 are aligned with the two outlet openings 32 and 34, respectively. Each cylinder 36, 38 has a cylinder head 40 with a central air nipple 42. A free piston 44 is situated in the respective cylinder and each has an upper flexible, resilient diaphragm 46 that is stretched across the cylinder and is secured between the wall of the cylinder and the cylinder head. A second, lower diagram 48 extends across the cylinder 36 or 38 below the respective piston 44, with a piston space being defined by these two diaphragms. The diaphragms are favorably made of a sheet or membrane of a flexible, resilient elastic material, e.g., a medical grade or food grade silicone rubber material. The material should be a type that can withstand elevated temperatures such as those used in ultra-high temperature pasteurization. The cylinder heads are secured by tri-clamps 50, and the upper part and lower part of each cylinder is also secured by a similar tri-clamp. While not shown here, the inlet and outlet tubes 12, 14, 16 are connected to flanged tubing of the piping (not shown) for the liquid product, e.g., by means of similar tri-clamps or other suitable connection devices.

Figure 4:
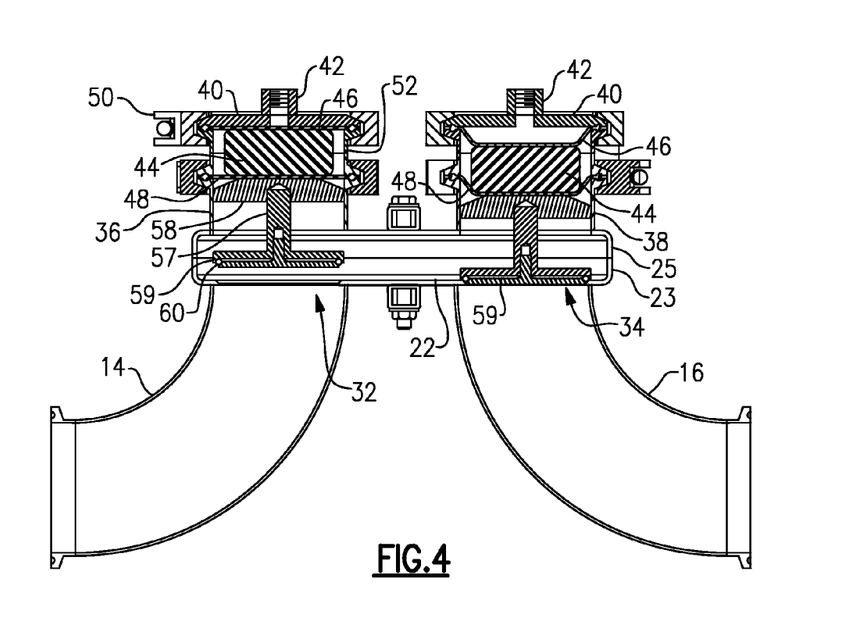
FIG. 4 is a cross sectional view thereof showing the piston(s) and diaphragm(s) in a raised or open and lowered or closed positions.
Figure 5:
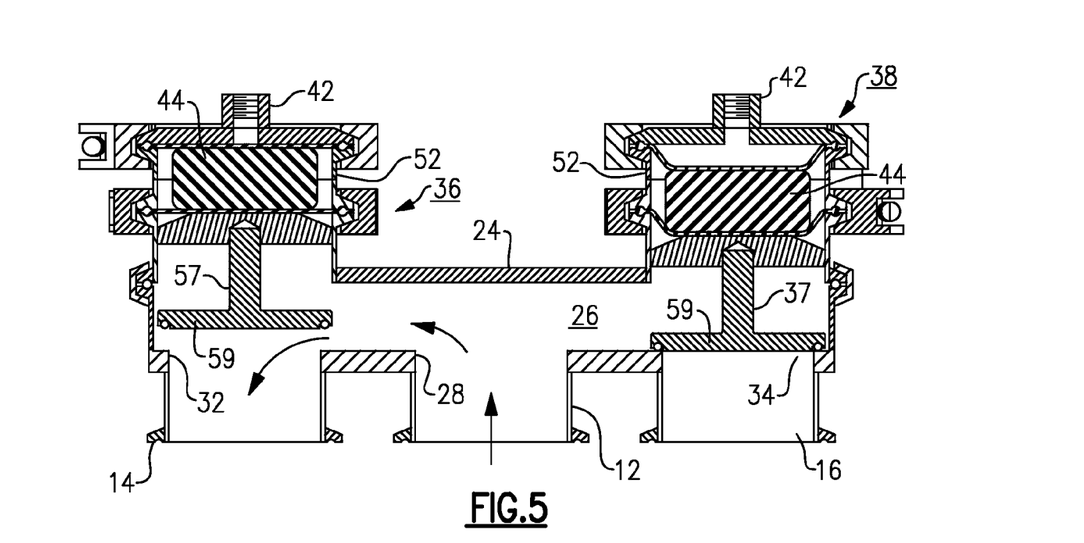
FIG. 5 is a cross sectional view thereof showing the piston(s) and diaphragm(s) for explaining operation thereof.

Within each cylinder, and beneath the respective piston is a valve member 54, which comprises a valve stem 57, oriented along the cylinder axis, with a head disk 58 at its upper end which contacts against a lower surface of the lower diaphragm 48. Each valve member has a valve foot 59 at the lower end of the valve stem 57, which may be in the form of a disk to mate with and seat in the respective valve opening 32 or 34. In this embodiment, the openings 32 and 34 are flush with the upper surface of the lower plate 22 of the valve body. The openings 32, 34 are also beveled at the upper surface of the lower plate, and each tapers to form a conic surface. The valve feet 59 are of a two-part construction, and are designed to secure a seal ring 60 at the periphery of the respective foot. The seal ring 60 seats against the conic beveled surface at the top of the respective valve opening.

Figure 1:
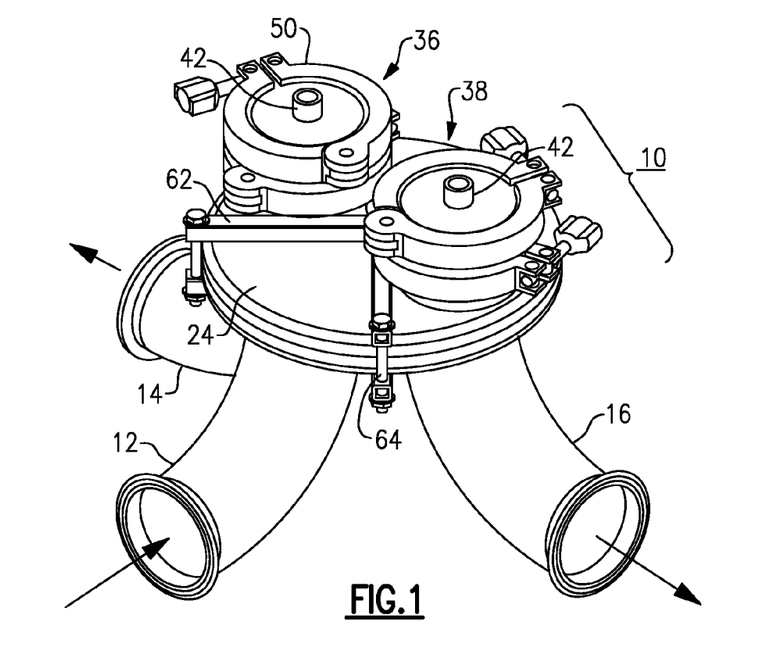
FIG. 1 is perspective view of an aseptic or sanitary diaphragm valve according to one embodiment of the invention.
Figure 2:
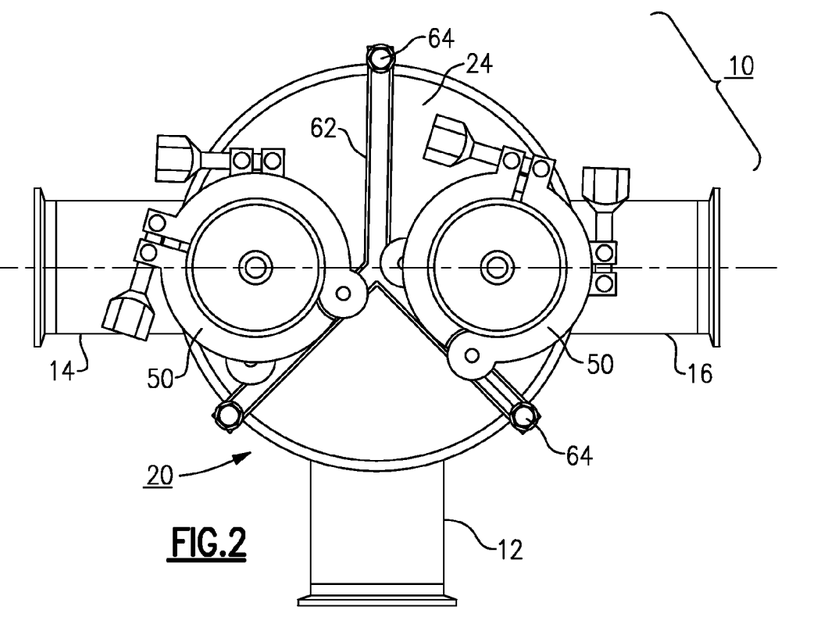
FIG. 2 is a top plan view thereof.
Figure 3:
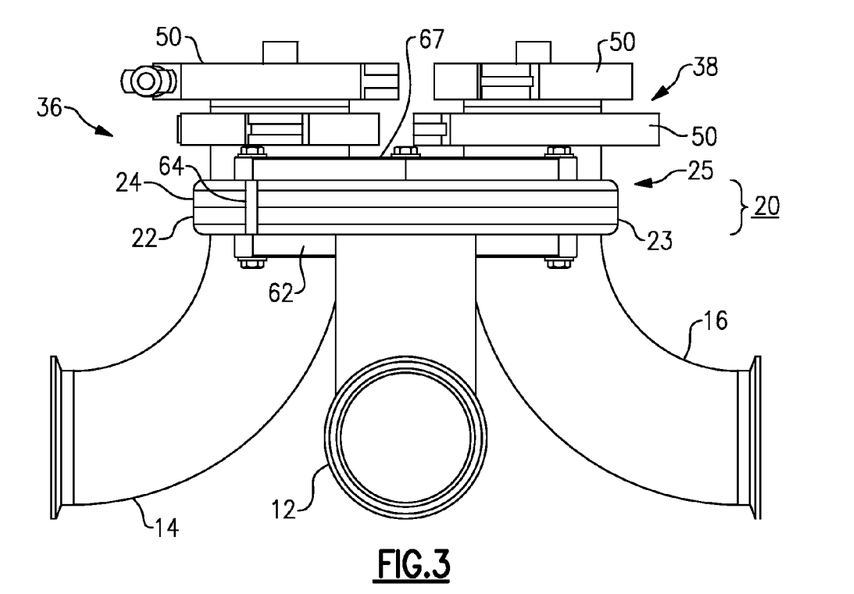
FIG. 3 is a side elevation thereof.

As shown in FIGS. 1, 2, and 3, there may be a Y-shaped clamp 62, formed of upper and lower Y-shaped members that secure the clamshell valve body 20 together to resist the bursting force of the process fluid, as the process fluid is typically under significant pressure. The upper and lower Y-shaped members have arms that radiate out from a point at the center of the valve body disks or plates. The radially outer ends of these arms are secured to one another by means of threaded fasteners, e.g. posts or bolts 64.

The operation of the valve of this embodiment may be explained with reference to FIG. 5. The valve 10 of this embodiment may be considered as a diverter valve, in which the normal flow is in the direction into the inlet tube 12, out the outlet tube 14 and along a normal process pathway. The outlet opening or port 34 to the other outlet tube 16 is normally valved off. The outlet tube 16 leads to a bypass pathway or diversion pathway.

Normally, the air pressure is low or relieved at the nipple 42 of the cylinder 36 (at the left in this view) so that the valve foot 59 is raised from the outlet opening 32, and air pressure is applied to the nipple 34 of the other valve cylinder 38 (shown at the right). The diaphragm 46, piston 44, and lower diaphragm 48 are pushed down in that cylinder, urging the valve foot 59 against the valve opening 34. The flow of the process fluid, e.g., milk, then proceeds along the direction indicated by the arrows.

When air pressure to the cylinder 38 is relieved, the pressure of the liquid product pushes the valve foot and valve member up, raising the piston 44 and the diaphragms 46, 48. At the same time, air pressure is applied to the air nipple of cylinder 36, urging the piston 44 downward, with diaphragms 46 and 48 also moving downward, and urging the associated valve member 54 and its foot 59 down to seat against the valve opening 32. This action closes off the main process pathway and opens the bypass pathway.

In this embodiment, the pistons 44 are free pistons, i.e., not rigidly attached to the associated valve member, and are restrained only by the associated diaphragms 46 and 48 above and below. The piston itself can be formed of a suitable lightweight plastic material or formed from aluminum, and provided with a low friction coefficient with respect to the cylinder walls.

Any fluid that enters the piston space, that is, the space below the diaphragm 46 and above the diaphragm 48, will seep out a leakage detection opening 52 at the side of the cylinder, and provide a visible indication of possible diaphragm failure. When this occurs, it is a simple matter to remove the tri-clamp or tri-clamps, lift off the cylinder head and/or the upper cylinder part, and then change out the diaphragms 46, 48. The change out can be performed in the plant, and does not require removing the valve from the piping, nor is factory maintenance or repair needed. Also, in this design the control air cannot leak into the fluid product, as the space between the diaphragms 46 and 48 remains at ambient pressure due to the presence of the leak-detection aperture 52.

The flow space 26 thickness within the valve body need only be one-half the radius of the valve outlet openings 32 and 34 to achieve an unobstructed full flow of the liquid product.

In the design of this embodiment, there are no obstructed or closed off areas in the valve cavity. This construction allows the valve 10 to be cleaned in place by flowing a cleaning solution and a sterilizing fluid through it.

Figure 6:
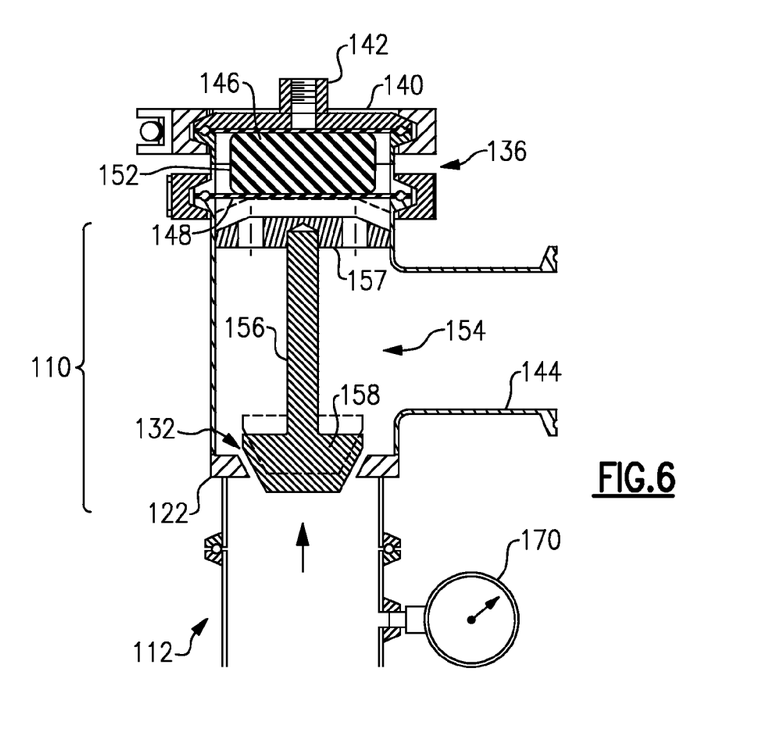
FIG. 6 is a cross sectional view of a second embodiment.

A second embodiment of this sanitary diaphragm valve of this invention is shown in FIG. 6, in which parts and elements that correspond to those in the first embodiment are identified with similar reference numbers but raised by "100" and a detailed description of those elements need not be fully repeated. In this element, the double diaphragm valve 110 has only an inlet port and outlet port, and can serve as a pressure control valve. The valve has a lower plate 122 with a circular opening 132 that has a beveled upper portion forming a generally conic valve seat surface, the opening leading to an inlet pipe 112 which receives the flow of process fluid, e.g., milk. A cylinder 136 rises above a flow chamber 126 and is generally centered on the opening 132. An outlet tube 114 leaves the flow chamber 126.

The cylinder 136 has a cylinder head 140 with an associated air nipple 142, a piston 144, with an upper diaphragm 146 that is secured in the cylinder 136 above the piston 144 and a lower diaphragm that is secured in the cylinder below the piston. The air nipple 142 is connected to an associated control air line (not shown).

A valve member 154 has a stem 156 that extends along the axis of the cylinder, a head disk 157 that rests against an under surface of the lower diaphragm 148 and a foot or stopper 158, here of a generally conic shape, which seats into the opening 132. The valve member 154 rises to allow the stopper 158 to lift up, away from the valve opening 132 until the downward force on the piston 144 equals the upward force of the process fluid against the valve head 157 and diaphragm 148. Air pressure to the nipple 142 is controlled to permit the valve 110 to control the pressure leaving out the outlet tube 114. A pressure gauge, here represented by element 170 is in fluid communication with the process fluid, either at the outlet side or as shown here at the inlet side of the valve. This pressure gauge may be electrically connected with the air pressure controls as a feedback agent to assist in keeping the fluid pressure at the desired level.

As with the previous embodiment, a leak detection aperture 158 is provided at the piston space of the cylinder, and reveals any flow of fluid, i.e., in case there is a rupture or either diaphragm 146 or 148. Also, as shown here, there are flow openings in the valve member head 157, which assist in the flow of cleaning fluid during a CIP operation.

Figure 7:
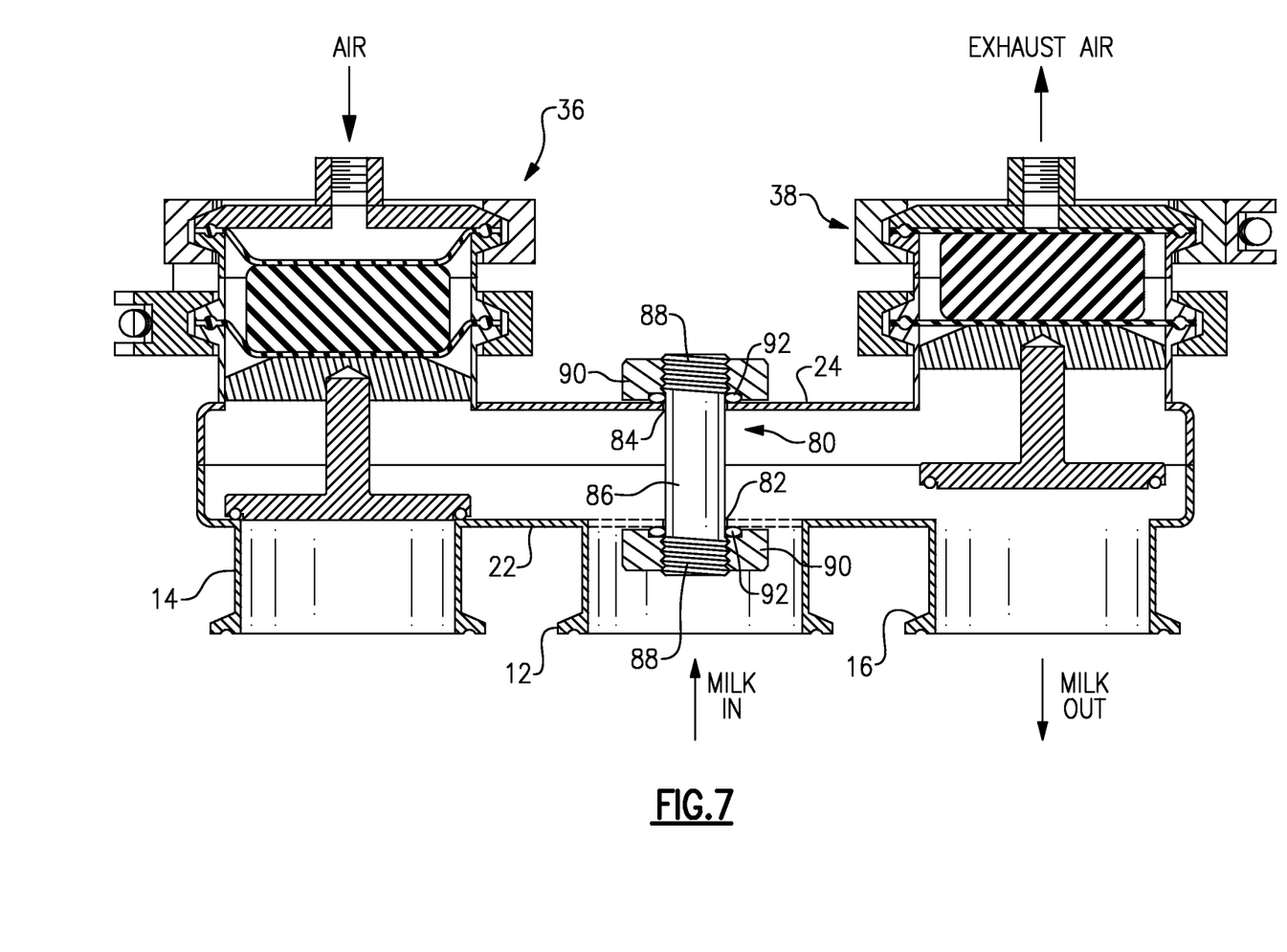
FIG. 7 is a cross sectional view of the an alternative embodiment.

FIG. 7 shows a variation of the first-described embodiment, in which the Y-shaped clamp arrangement is replaced with a tension absorbing post that passes through the valve body. Here elements that are identical with those in the earlier-described embodiment are identified with the same reference numbers, and additional description of those elements is omitted.

In this embodiment, the valve body 20 is provided with central openings 82 and 84 in the lower plate or disk 22 and in the upper plate or disk 24. The post 80 has a smooth-surface shank 86, i.e., without any exposed threads, at the portion that is in contact with fluid within the valve. The post 80 has threads 88 at its ends only. Female-threaded caps or nuts 90 are secured to these threads 88 and these caps are turned down on the threaded ends of the post 80 until the caps 90 rest against the outer sides of the valve plates 22 and 24. Upper and lower seal rings 92 are positioned on the shank of the post 80 and close off the outer ends of the openings 82 and 84. The seal rings 92 close off the valve space 26 within the main valve body, and prevent the threads of the post 80 from being exposed to any process fluid. This is a significant feature as it permits the valve to be cleaned in place by means of a flow of a cleaning fluid, without having to disassemble the valve for cleaning.

Figure 8:
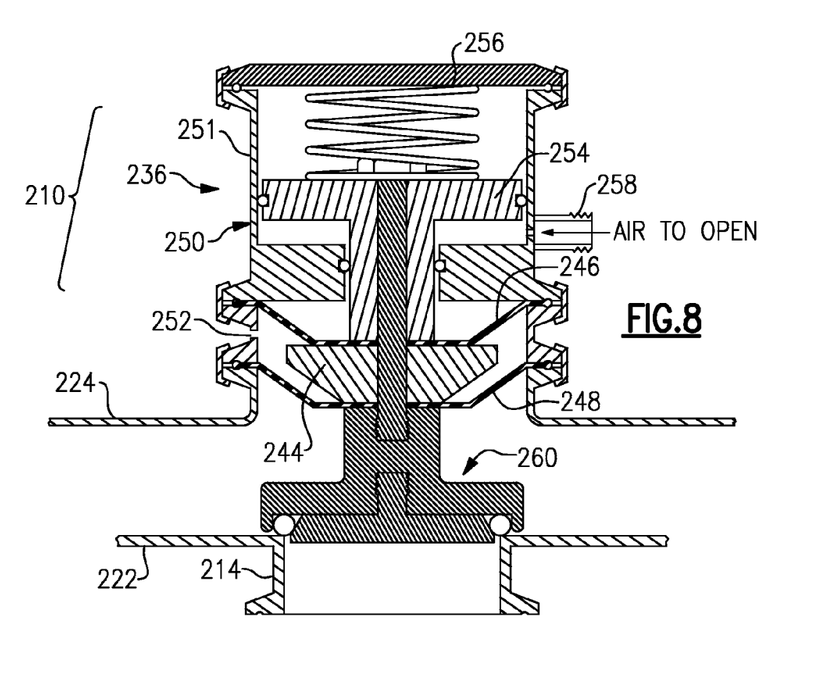
FIG. 8 is a cross section of a normally-closed or air-to-open embodiment.

Another embodiment, in which the valve is normally biased closed, and in which air is applied to open the valve, can be seen FIG. 8. Here relevant portions of an aseptic or sanitary dual diaphragm valve 210 are shown, where the major elements of the valve are the same as described earlier, and similar parts are identified with similar reference numbers but raised by "200." The cylinder 236 here has an attachment 250 in the form of a flanged tube with an upper air cylinder 251, which contains an air piston 254 that has a lower end portion biasing against the main piston 244. The main piston 244 is positioned between an upper diaphragm 246 and a lower diaphragm 248. A compression spring 256 biases the air piston 254 downward, and the piston 244 urges the valve member 260 downward so that it reaches its lowered position to close the associated valve port. An air nipple 238 applies the control air to the upper cylinder 251 below the air piston 254 to raise it. There are seals at the skirt of the piston 254 and in the tubular attachment 250 to seal the control air from flowing down into the cylinder 236 and to confine air to the upper cylinder 251. Application of air pressure relieves the downward spring force on the piston 244 and on valve member 260, raising the latter to its open position. When the air pressure is removed, the spring 256 again biases the valve shut. A leak detection opening 252 appears between the diaphragms 246, 248

Figure 9:
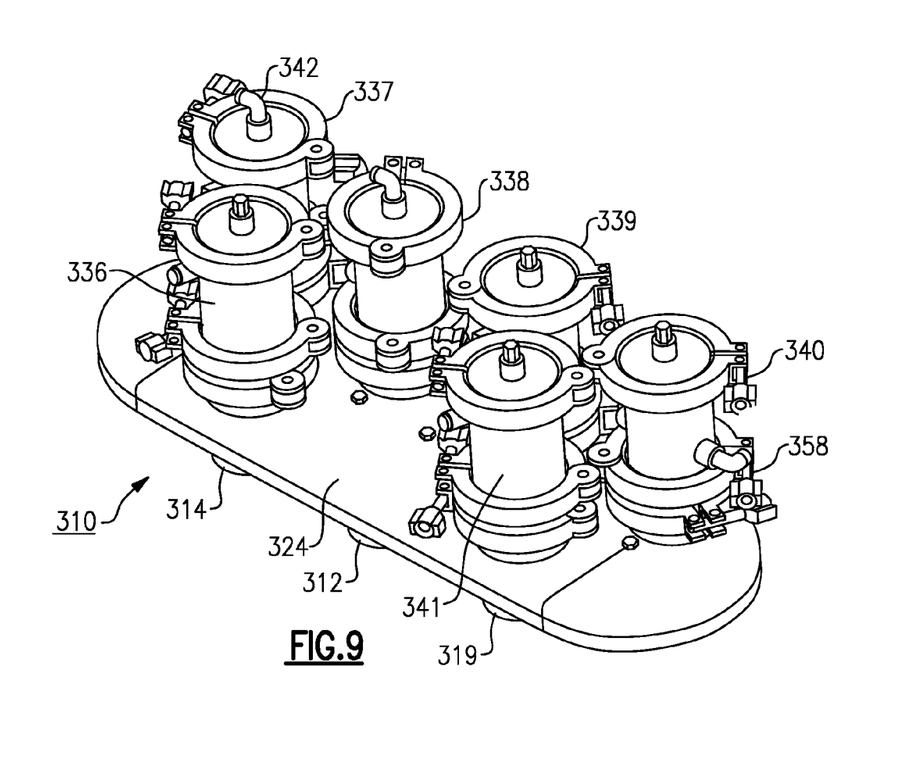
FIG. 9 is a perspective view of an additional embodiment.
Figure 10:
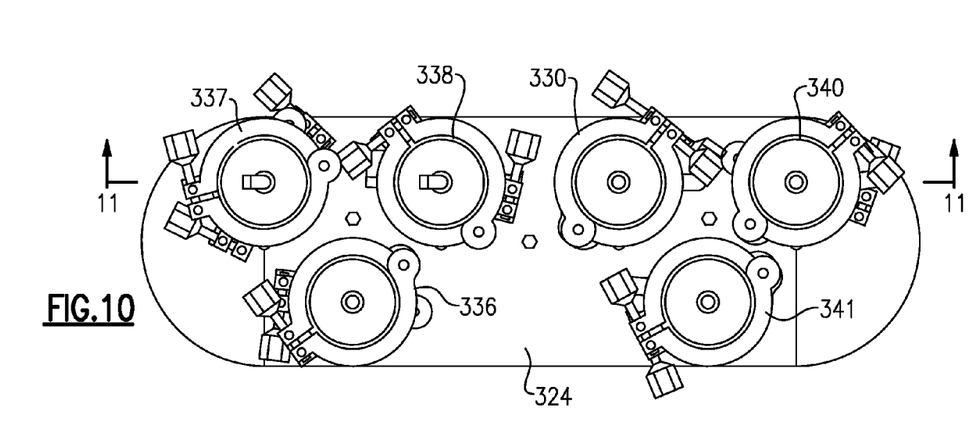
FIG. 10 is a plan view of this embodiment.
Figure 11:
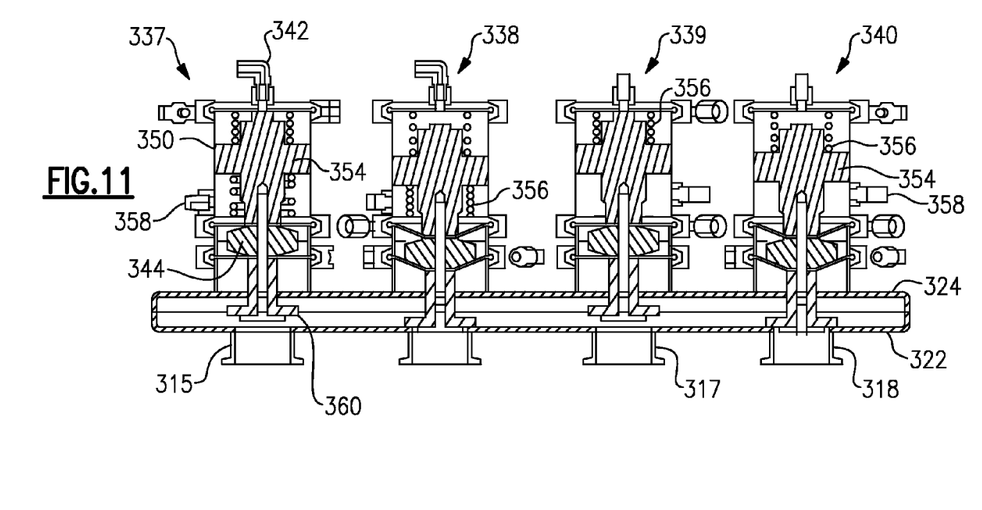
FIG. 11 is a sectional elevation taken at 11-11 of FIG. 10.

A multiple-outlet valve according to an embodiment of this invention is shown in FIGS. 9, 10 and 11. Here, elements in common with earlier embodiments employ the same reference numbers, but raised by "300". The valve 310 is of a one-inlet, six-outlet design, in which the valve may direct the fluid entering the inlet tube 312 to any of the six outlet tubes 314, 315, 316, 317, 318 or 319. The inlet and outlet tubes are supported on a lower plate 322, and there are associated cylinders 336, 337, 338, 339, 340 and 341 located on an upper plate 324. Controlled air pressure is applied to the respective upper cylinder attachments 350 to open or close the passages to the associated outlet tubes, as discussed in respect to other embodiments, and as each of the cylinders happens to be configured. FIG. 11 shows the construction of the cylinders 337, 338, 339 and 340, in cross section. Here, the valve 310 is shown with the some of the valve cylinders configured as normally-closed (air-to-open) and with some as normally open (air-to-close). Valve cylinders 337 and 338 are configured as normally open or air-to-close (as in the FIGS. 1 to 7 embodiments) while valve cylinders 339 and 340 are configured as normally closed or air-to-open (as in the FIG. 8 embodiment). In this embodiment, there are fittings on the cylinder head and on the lower part of the cylinder attachment so that the air nipple may be positioned on either on the cylinder head (as in nipple 342) or beneath the air piston (as in air nipple 358). The air piston 354 is shaped so that the associated coil spring 356 may be positioned either beneath (see cylinders 337 and 338) for air-to-close operation, or above (see cylinders 339 and 340) for air-to-open operation. Any or all of the outlet tubes could be open or closed, as desired for a given application. The outlet tubes may be arranged in-line in one or more rows, as shown, or distributed around a center position. In other embodiments, there may be more than one inlet tube, which may be valved. Each of the cylinders is provided with a leak-evident opening at the space between the upper and lower diaphragms, as in the previously described embodiments.

Figure 12:
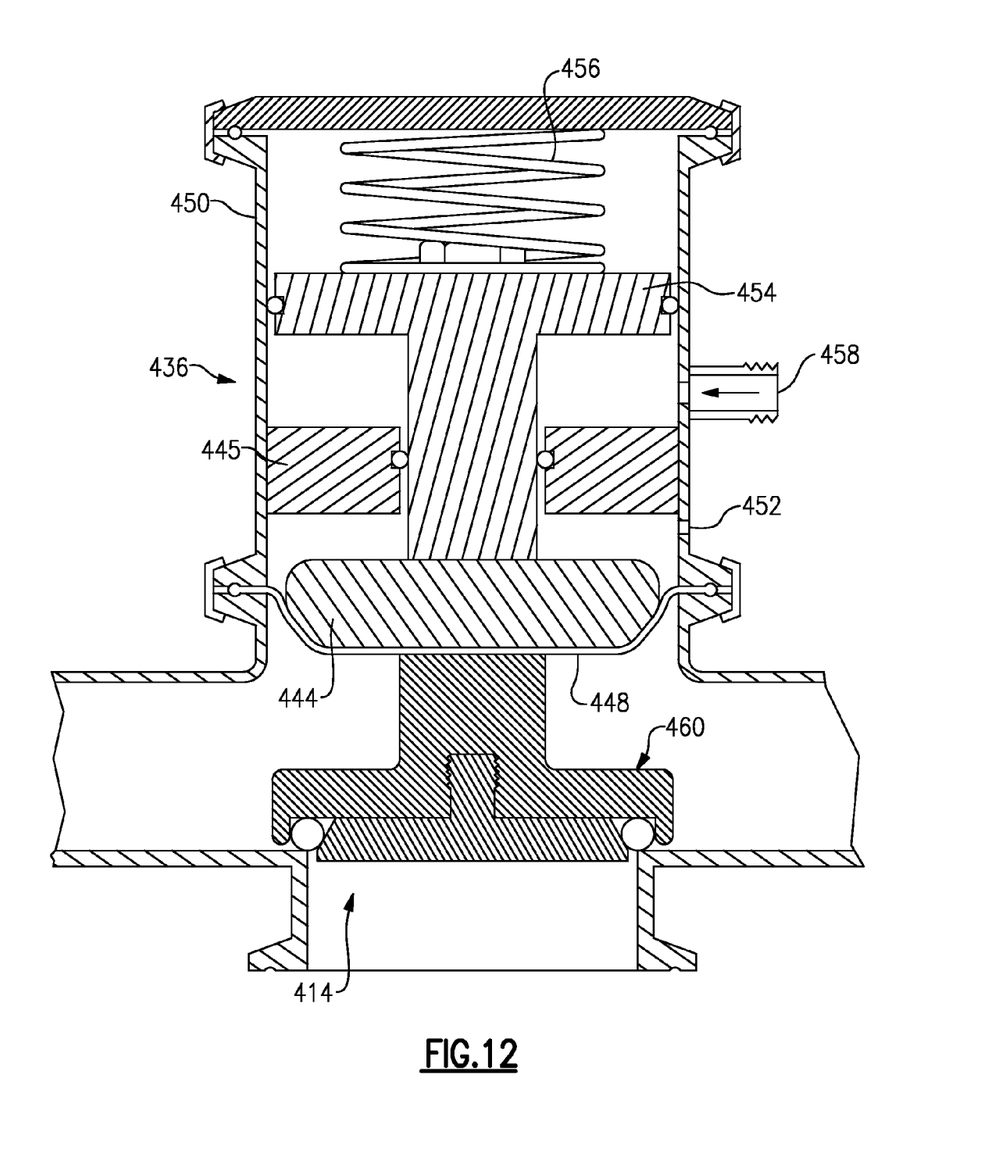
FIG. 12 is a cross sectional view of another alternative embodiment.

FIG. 12 shows another variant of the valve mechanism of this invention, which is similar to the embodiment of FIG. 8. Here similar components are identified with similar reference numbers but raised by 400. In this version, spring force holds the valve member closed, but when air pressure is applied to the nipple 458, the piston 454 collapses the spring 456 and internal pressure and flow forces automatically open the valve to flow.

Here, one cylinder 436 has an upper cylinder portion 450 including a piston 454 with a compression spring 456 that serves to press the piston 454 downward to hold the valve member foot 460 closed against the opening to the valve outlet (or inlet) 414. One of the diaphragms 448 is shown, as is the air nipple 458, and a leak detector opening 452. In this embodiment the interior diameter of the cylinder 436 (2¾ inches) is greater than the diameter of the valve foot 460 at the outlet opening 414 (1¾ inches). Internal fluid pressure thus creates a net upward force, which will open the valve when the spring force is overcome. Air pressure applied to the nipple 458 adjusts the pressure at which the valve opens. In the FIG. 12 embodiment, a free piston 444 is situated at the lower end of the shaft 437 of the piston 454, and bears on the diaphragm 448. This urges the valve foot 460 downward against the valve opening 414. The shaft 437 passes through a central passage in a plate or disk 445 that closes off the cylinder chamber of the piston 454. A seal ring in the passageway seals against the shaft 437 to block any leakage. In this embodiment, only the one diaphragm, i.e., lower diaphragm 448 is required. Alternatively to the arrangement shown, the spring 456 can be positioned between the piston 454 and disk 445, and the position of the air nipple 458 can be above the piston 434, which reverses the piston action. This is similar to what is shown in the embodiment of FIG. 10.

Figure 13:
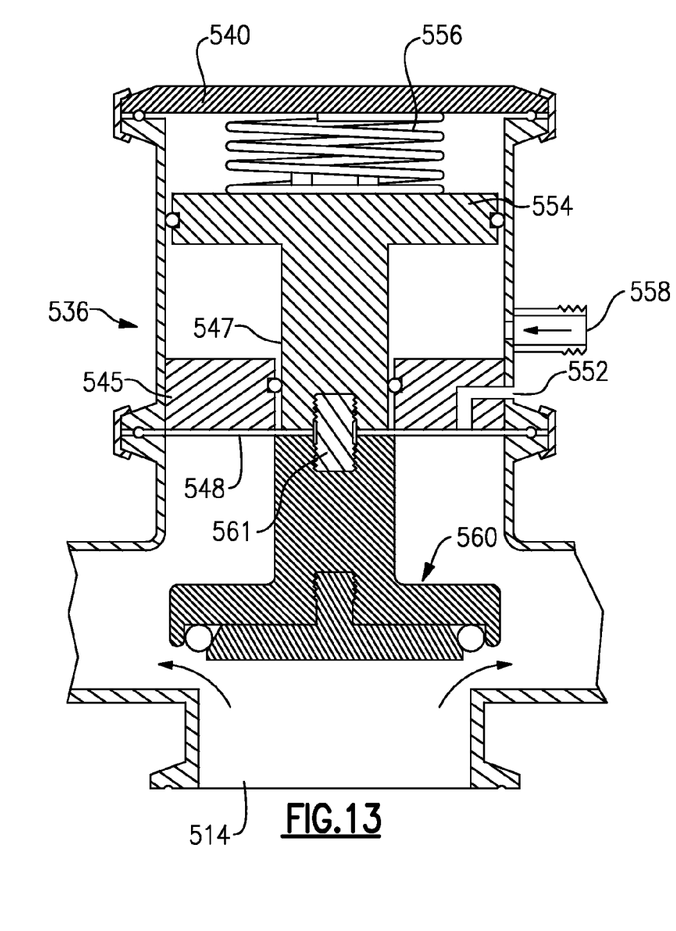
FIGS. 13 and 14 are cross sectional views of still another embodiment.
Figure 14:
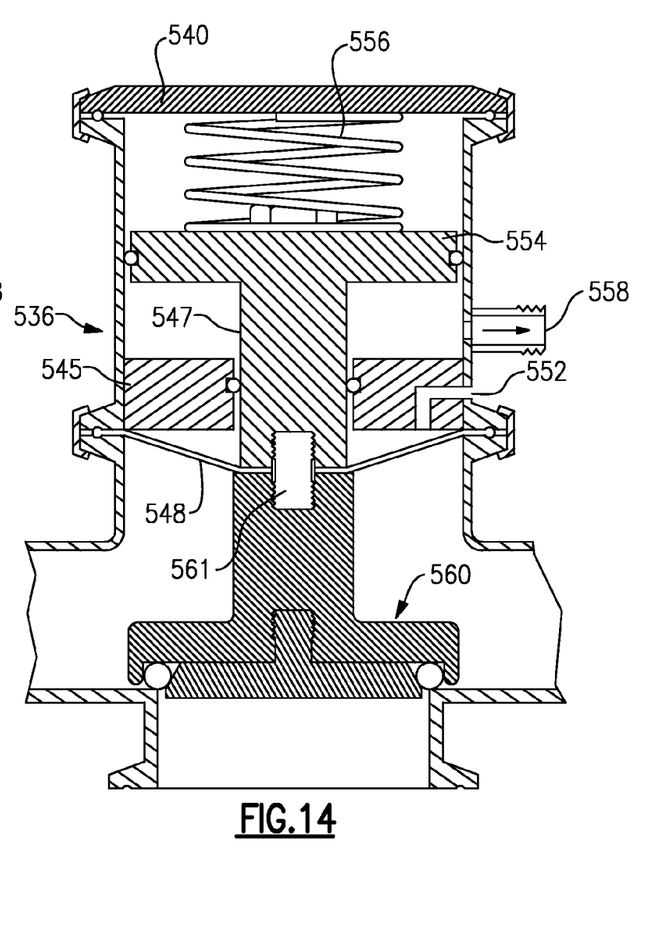

A further embodiment of the diaphragm valve of this invention is illustrated in FIGS. 13 and 14, in which similar reference numbers are used to identify elements that correspond to the elements of the earlier-described embodiments, but raised by 500. The valve 510 is constructed as a single-diaphragm valve, somewhat like the embodiment of FIG. 12, with a shaft or stem 547 of the piston 534 penetrating the diaphragm 548 and being joined with the valve foot 560 that seats on the associated valve opening. This arrangement with the shaft or stem penetrating the diaphragm is somewhat similar to the embodiment of FIG. 8. The piston 554 travels within the cylinder 536, and a chamber is defined within the cylinder between the cap or top 540 and a plate or disk 545 that is affixed in the cylinder below the piston. The disk 545 has a central bore or passage therethrough, through which the stem 547 passes. A ring seal is disposed in this bore to seal against the stem 547. The lower end of the shaft or stem 547 is attached by a threaded post 561 to the upper portion of the valve foot 560. The threaded post 561 also penetrates the diaphragm 548, and pulls opposing faces of the stem 547 and the valve foot 560 against the diaphragm to ensure a seal between the fluid flow space of the valve and the chamber of the valve above the diaphragm. In this embodiment, the upper portion of the valve foot 560 forms an extension of the stem, but other equivalent implementations are possible.

A compression spring 556 is positioned above the piston 554 between an upper face of the piston and the valve head 540, which urges the valve foot to a normally closed condition against the valve opening 514 (FIG. 14). In this case, control air is applied via an air nipple 558 below the piston to raise the piston and valve foot to their open condition (FIG. 13). Also, the valve as shown may be used with air at a predetermined pressure to control the pressure of the fluid entering from the valve opening 514. Alternatively, the spring 556 can be positioned below the piston 554, i.e., between the lower face of the piston and the plate or disk 545, so that the valve is normally urged open. Air would then be applied to a nipple (not shown here) in the valve head 540 above the piston to urge the valve closed.

A leakage disclosure opening 552 is shown here penetrating from outside the cylinder 536, radially inward through the plate or disk 545, to a point between the disk 545 and the flexible diaphragm 458.

A dual-diaphragm construction, such as is illustrated in FIG. 8, could be substituted here, if desired. Also, the diaphragm valve as described here could be applied on a tubular valve housing, rather than the generally clamshell-shape housing as specifically illustrated in preferred embodiments, or in other implementations not requiring flat upper and lower plates.

In each of the described embodiments, the terms upwards, downwards, upper, lower, left and right are employed for simplicity of explanation in respect to the drawing figures. In any practical implementation, however, the valve assembly could be positioned in many other orientations. These terms as used in the specification and in the claims are not intended to limit the valve to any specific orientation.

The aseptic or sanitary diaphragm valves of this invention can be serviced in place, e.g., to replace any of the pistons or diaphragms, simply by removing the tri-clamp fasteners, disassembling the valve body, and replacing or changing out the diaphragms, piston(s) or any associated seals.

The sanitary diaphragm valve can be cleaned in place, as the construction of the valve flow space allows cleaning solution to reach every area of the valve cavity.

The simple construction of the valve, without complex shapes of cavities or passageways, and with only a minimum number of required parts, makes these valves inexpensive to manufacture, and simple to install and maintain. The valve is sturdy and reliable.

While the invention has been described with reference to a number of preferred embodiments, it should be understood that the invention is not limited only to those embodiments. Rather many variations are possible without departing from the scope and spirit of this invention, as defined in the appended Claims.

I claim:

1. An aseptic or sanitary diaphragm valve comprising:
   a flat lower plate of which an upper side has a first round opening leading to a first tubular port on a lower side of the plate, and a second opening leading to a second tubular port on the lower side of the plate;
   a flat upper plate generally coextensive with said lower plate and spaced above it and sealably joined thereto so as to define a sealed flow space therebetween sealed off from the ambient, the upper plate having at least one cylinder therein situated above said first opening and in register therewith, the cylinder extending upwards above the upper plate and having a lower side facing said first opening;
   a piston within said cylinder and movable between raised and lowered positions;
   a clamp removably joining the flat lower plate and the flat upper plate together in clamshell fashion to define said flow space therebetween;
   wherein said flat lower plate and said flat upper plate are cooperatively shaped and have respective mating circumferential flanges that permit the lower plate and upper plate to fit together in a sealed clamshell fashion with said flow space defined therebetween;

a plate member affixed within said cylinder and extending across said cylinder below said piston and having a central bore therethrough;

a valve member having a stem passing through the central bore of said plate member to connect to said piston, and being aligned axially with said cylinder and said first round opening, and having a lower valve plug at a lower end of said stem and aligned with said lower opening and adapted to close against same when the piston is in a lowered position and to raise away from the first round opening when the piston is in its raised position;

a flexible diaphragm positioned below said plate member and extending across said cylinder above said flat upper plate, and with said stem penetrating said flexible diaphragm and being sealably affixed thereto, the flexible diaphragm being adapted to permit the piston to travel between its raised and lowered positions; and means for controllably applying a closing force to an upper surface of said first flexible diaphragm to urge the piston from the raised to its lowered position to effect seating of the valve member onto said first opening, and controllably releasing said closing force therefrom to allow the piston to rise from its lower position toward its raised position to permit lifting of the valve plug from said first opening.

2. The diaphragm valve of claim 1 wherein said flexible diaphragm comprises a flat sheet of a silicone rubber.

3. The diaphragm valve of claim 1 wherein said cylinder includes a leakage evident opening extending from between said plate member and said flexible diaphragm.

4. The diaphragm valve of claim 3 wherein said leakage evident opening includes a bore passing axially into said plate member and opening into a space between said diaphragm and said plate member.

5. The diaphragm valve of claim 1 wherein said first opening has an edge beveled below the upper surface of the lower plate.

6. The diaphragm valve of claim 1 wherein said bore through said plate member includes a seal ring bearing against said stem.

7. The diaphragm valve of claim 1 wherein said first round opening has a predetermined radius and said flow space has a thickness defined between said upper and lower members that is substantially one-half the predetermined radius of said first round opening.

8. An aseptic or sanitary diaphragm valve comprising:

a flat lower plate having an upper side which has a first round opening leading to a first tubular port on a lower side of the flat lower plate, a second opening leading to a second tubular port on the lower side of the flat lower plate; and a third round opening leading to a third tubular port on the lower side of the flat lower plate;

a flat upper plate generally coextensive with said lower plate and spaced above said lower plate and sealably joined thereto so as to define a sealed flow space therebetween sealed from the ambient; the upper plate having a first cylinder formed therein situated above said first opening and in register therewith, the cylinder extending upward above the second plate and having a lower side facing said first opening, and a second cylinder formed therein situated above said second opening and in register therewith, the cylinder extending upward above the second plate and having a lower side facing said second opening;

wherein said flat lower plate and said flat upper plate are cooperatively shaped and have respective mating circumferential flanges that permit the lower plate and upper plate to fit together in a sealed clamshell fashion with said flow space defined therebetween;

a clamp removably joining the flat lower plate and flat upper plate together in clamshell fashion to define said flow space therebetween;

first and second pistons within said first and second cylinders, respectively, and each being independently movable between a raised position and a lowered position;

in each of said cylinders, a plate member extending across the respective cylinder below the respective piston and having a central bore therein, and a flexible diaphragm situated across the respective cylinder below the associated plate member and above said flat upper plate, the diaphragms being adapted to permit the associated piston to travel between its raised and lowered positions;

for each said cylinder, a valve member having a stem aligned axially with the respective cylinder and the associated one of said first and second openings, the stem extending through the associated diaphragm and the bore of the associated plate member to said piston, and having a valve foot at a lower end of the associated stem and aligned with the associated one of said first and second openings and adapted to close against the same when the associated piston is in its lowered position, and to raise away from the associated one of said first and second openings when the piston is in its raised position; and means for controllably applying a closing force to the respective cylinders to urge the associated piston from its raised position to its lowered position to effect seating of the valve foot onto the respective one of said first and second openings, and controllably releasing the closing force therefrom to allow the associated piston to rise from its lower position to its raised position for lifting the valve foot from the associated one of the first and second openings.

9. The diaphragm valve of claim 8 wherein each said cylinder has an air nipple therein to receive compressed air for controllably applying a force onto the associated piston.

10. The dual diaphragm valve of claim 8 wherein said flexible diaphragms each comprise a flat sheet of a silicone rubber.

11. The diaphragm valve of claim 8 wherein each said cylinder includes a leakage evident opening therethrough extending from between said plate member and the associated flexible diaphragm.

12. The diaphragm valve of claim 8 wherein each said lower foot is generally in the form of a disk spanning the associated one of the first and second openings, and wherein each said lower disk includes a ring seal supported at a periphery thereof.

13. The diaphragm valve of claim 8 wherein each of said first and second openings has an edge beveled below the upper surface of the lower plate.

14. An aseptic or sanitary diaphragm valve comprising:

a lower member of which an upper side has a first round opening of a predetermined radius leading to a first tubular port on a lower side of the member;

an upper member generally coextensive with said lower member, and spaced above it, and sealably joined to the lower member so as to define a sealed flow space therebetween, the upper member having at least one cylinder therein situated entirely above said first opening and in register therewith, the cylinder extending upwards above the upper member and having a lower end at said upper member and facing said first opening;

said lower member and said upper member having mating circumferential flanges permitting the lower member and the upper member to be sealably joined together in clamshell fashion to define said flow space therebetween; and wherein said lower member and said upper member are cooperatively shaped;

a clamp removably holding the lower member and the upper member together in sealed clamshell fashion with said flow space therebetween;

a second tubular port communicating with said flow space;

a piston within said cylinder and movable between raised and lowered positions;

a plate member affixed within said cylinder and extending across said cylinder below said piston and having a central bore therethrough;

a valve member having a stem passing through the central bore of said plate member to connect to said piston, and being aligned axially with said cylinder and said first opening, and having a lower valve plug at a lower end of said stem and aligned with said lower opening and adapted to close against same when the piston is in a lowered position and to raise away from the first opening when the piston is in its raised position;

a flexible diaphragm positioned below said plate member and extending across said cylinder and above said upper member, and with said stem penetrating said flexible diaphragm and being sealably affixed thereto, the flexible diaphragm being adapted to permit the piston to travel between its raised and lowered positions; and means for controllably applying a closing force to an upper surface of said first flexible diaphragm to urge the piston from the raised to its lowered position to effect seating of the valve member onto said first opening, and controllably releasing said closing force therefrom to allow the piston to rise from its lower position toward its raised position to permit lifting of the valve plug from said first opening.

15. The diaphragm valve of claim 14 wherein said flexible diaphragm comprises a flat sheet of a silicone rubber.

16. The diaphragm valve of claim 14 wherein said cylinder includes a leakage evident opening extending from between said plate member and said flexible diaphragm.

17. The diaphragm valve of claim 16 wherein said leakage evident opening includes a bore passing axially into said plate member and opening into a space between said diaphragm and said plate member.

* * * * *